BEST AVAILABLE COPY

J. L. TURNER.
Waste-Pipe Trap.

No. 8,281. Reissued June 11, 1878.

Attest:
Wendell E Turner
Edw L Woodbury

Inventor.
James Lawrence Turner

N. PETERS, PHOTO-LITHOGRAPHER, WASHINGTON, D. C.

UNITED STATES PATENT OFFICE.

JAMES L. TURNER, OF NEW YORK, N. Y.

IMPROVEMENT IN WASTE-PIPE TRAPS.

Specification forming part of Letters Patent No. 197,301, dated November 20, 1877; Reissue No. 8,281, dated June 11, 1878; application filed April 29, 1878.

*To all whom it may concern:*

Be it known that I, JAMES LAWRENCE TURNER, of New York city, in the county of New York and State of New York, have invented a new and useful Improvement in Waste-Pipe Traps, which improvement is fully set forth in the following specification, reference being made to the accompanying drawing.

The object of my invention is to allow the free and easy passage for proper substances to the sewers, and to afford absolute protection against the ascent and diffusion of deleterious gases into the buildings through which the waste-pipes pass.

Figure 1:
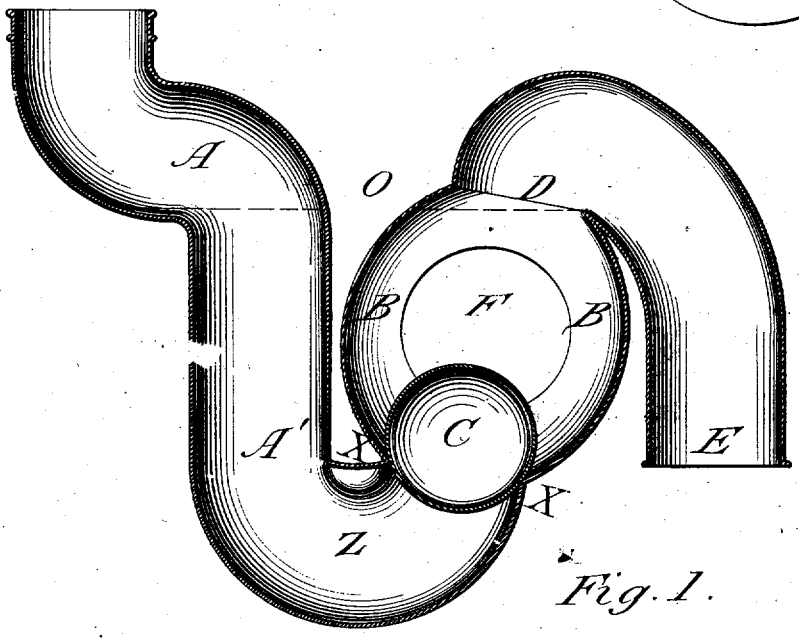

Figure 1 is a vertical section of the trap, which is divided into two chambers. The upper part of the first chamber, A, is to connect with the waste-pipe above it, and has a bend near the water-line. A′ is the lower portion of the same chamber with the furrowed curve Z.

Figure 2:
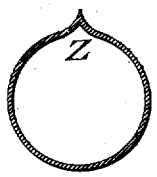

Fig. 2 is a perpendicular cross-section of the same portion of chamber A′, showing an antero-posterior view.

Figure 3:
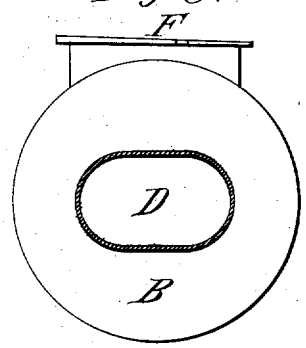

Fig. 3 is a horizontal section of chamber B, elongated and ovoid or bulbous in form, holding considerable more than chamber A between water-line O and the line of seal. This chamber is nearly upright and lengthened. In the most dependent part of this chamber is a narrow socket, X, in which the sinking ball C rests, dividing the two chambers. The outlet D is a free oblong opening, through which the ball C cannot pass, neither can it close it.

F is the hand-hole for removing the ball or exploring the two chambers. E is the connecting part of trap with waste-pipe communicating with the street-sewer. The improvements herein described are substantial, and the advantages great.

First, the bend in chamber A serves as a point of resistance against the direct force of a rapidly-descending volume of matter into the trap from a long upright pipe.

Second, the function of chamber B thus constructed is to prevent siphoning, as a considerable portion of the contents having space laterally, and being heavier than air, the latter will escape quickest after the contents in chamber A are lowered below the furrowed curve Z. After suction has ceased the remaining contents in this chamber fall back, forming a seal beside the ball C, which resumes its place in socket X. The ball may be of hollow metal, heavy enough to sink into its place when the contents of the trap are still. Any quantity of water or substance of greater volume and weight than the ball itself submerged, added to the contents of chamber A′, will cause it to move upward, allowing the excess to pass outlet D. Thus the quantities in the two chambers nearly equalize. Substantially the ball offers no obstruction to the downward and outward flow of contents. The object of the ball in its seat in this chamber is to prevent strong currents of gas within the pipes or from the street-sewer forcing its way through the trap, as pressure upon the water line O at D only holds the ball firmer in its seat X, thereby rendering it impossible for any gas by diffusion through the water (as it is well known occurs) to get into chamber A or the pipes above; also, in the event of loss of water-seal by evaporation of the fluid contents of the trap, by disuse of it a short time, the ball, resting in its seat, effectively closes the communication of the two chambers at that point, thereby affording protection against inefficiency from that cause. No accretions upon the sides of the chamber or the ball can take place, as the attrition of the water and ball will keep them free, and there is no place for sediment to accumulate.

Third, the short arm of curve Z is furrowed, thus allowing currents a less obstructive turn and a quicker escape of air from chamber A after siphoning has commenced, thereby aiding in breaking the continuity of its flow.

Fourth, the depth and diameter of chamber B are considerably greater than this part of the ordinary S form of trap, its depth varying from one-half to an inch between the curves, the diameter remaining the same as the extremities, while in the device described in this specification both depth and diameter are greater. An advantage of this peculiar construction is its increased holding capacity, the surface of which being exposed to the humid atmosphere of a soil or waste pipe renders the trap less liable to be affected by evaporation than if the air was more rarefied. It is also roomy, allowing free movement of the ball and substances passing through.

I claim as my invention—

The combination, in waste-pipe traps, substantially as described, of bend in chamber A, the furrowed curve Z, the elongated, enlarged, and ovoid or bulbous shaped chamber B, and the sinking ball C, as herein applied, for the purposes specified.

JAMES LAWRENCE TURNER.

Witnesses:

BENJAMIN A. MORAN,

JOHN H. GUNNER.